Dec. 19, 1939.   C. A. LEWIS   2,183,938
MARSHMALLOW TOASTER
Filed March 29, 1939
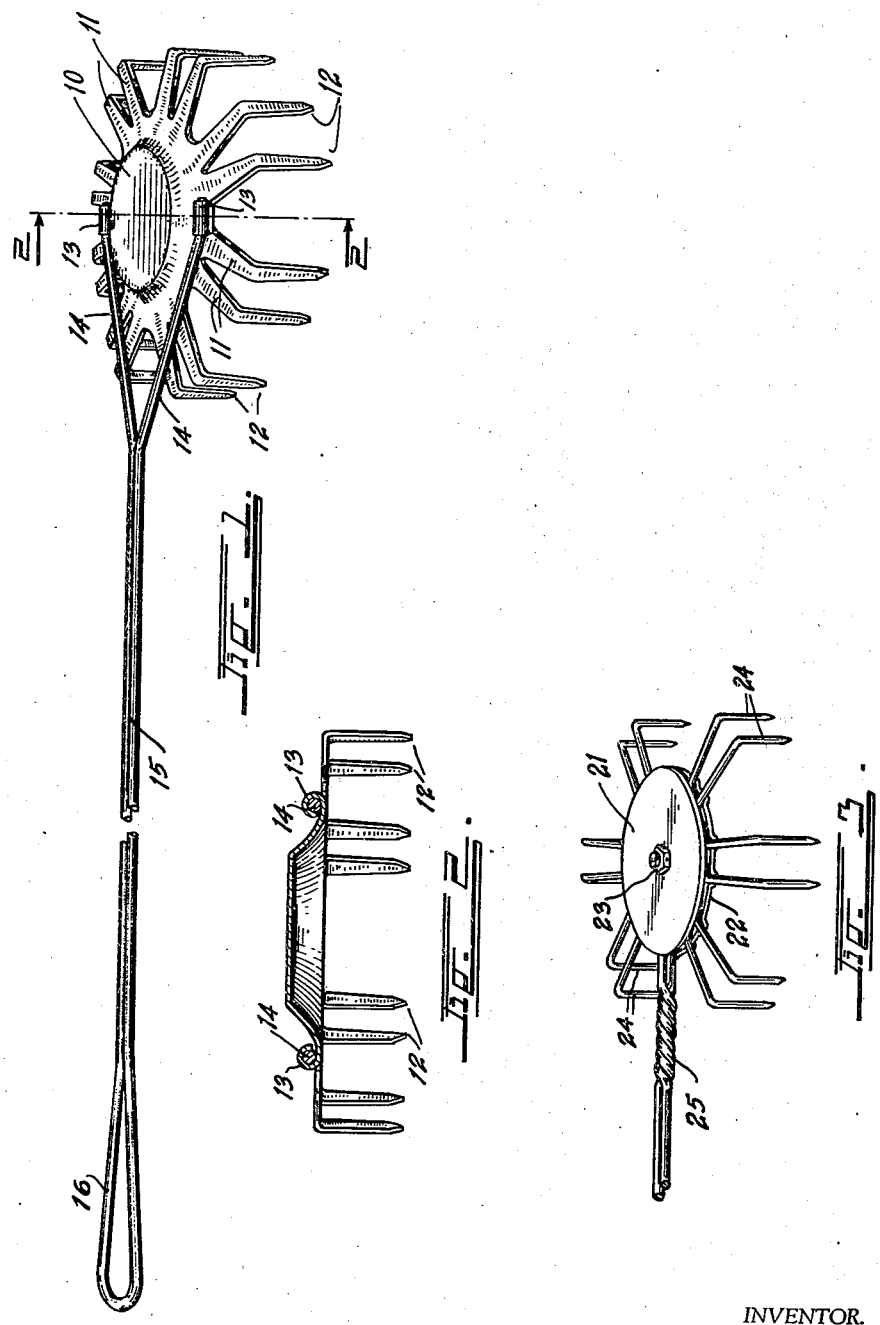
INVENTOR.
CHARLES A. LEWIS.
BY
ATTORNEY.

Patented Dec. 19, 1939

2,183,938

UNITED STATES PATENT OFFICE 2,183,938

MARSHMALLOW TOASTER

Charles A. Lewis, Lakewood, Colo.

Application March 29, 1939, Serial No. 264,851

4 Claims. (Cl. 53—5)

This invention relates to a culinary utensil or toaster and is more particularly designed for use on picnics, fries, roasts, and other out-of-door outings. The utensil is particularly useful for toasting and roasting marshmallows, weiners, and the like, over an open fire.

The principal object of this invention is to provide a compact, durable, lightweight utensil which can be efficiently used to perform a variety of different cooking operations over an open fire.

Other objects are: to provide a toaster to which the articles of food to be toasted or roasted can be securely fastened; and which can be easily and quickly assembled and disassembled.

Other objects and advantages reside in the detail construction of the invention, which is designed for simplicity, economy, and efficiency. These will become more apparent from the following description.

In the following detailed description of the invention reference is had to the accompanying drawing which forms a part thereof. Like numerals refer to like parts in all views of the drawing and throughout the description.

In the drawing:

Fig. 1 is a perspective view of one form of the invention.

Fig. 2 is a cross section through the utensil taken on the line 2—2, Fig. 1.

Fig. 3 is a perspective view of still another form of the invention.

The utensil or toaster, of the form illustrated in Figs. 1 and 2, consists of a dished plate 10 with a series of pairs of arms 11 projecting radially outward therefrom. The plate 10 and the arms 11 can be stamped from a single, solid sheet of metal that is a good conductor of heat. The arms 11 taper outwardly toward their ends and are all of equal length. The arms are bent at right angles, from the concave face of the plate, to form pairs of tines 12. On two directly opposite edges of the plate 10, handle receiving sleeves 13 are formed to receive extremities 14 of a handle 15.

The handle 15 consists of a round metal bar which is bent, as shown in Fig. 1, to form a looped handle grip 16 at its middle and terminating in the extremities 14. The extremities 14 detachably fit into the handle receiving sleeves 13.

To use this form of the invention, the extremities 14 of the handle are inserted into the receiving sleeves 13. A marshmallow is attached to each pair of tines 12, and the toaster is held over the fire with the tines projecting downwardly. When the marshmallows are toasted on their one side to a crisp brown, the toaster is turned over and dished part of the plate 10 is held over the center of the fire. Due to the concave portion of the plate, the fire and heat is flared outwardly and upwardly around the arms 11 and the tines 12 to evenly toast the marshmallows on their other side.

The use of the toaster is not limited to toasting marshmallows but has many other uses. An egg can be fried in the dished plate by holding the toaster over the fire with the tines extending upwardly. Also weiners can be roasted, or steaks can be broiled by securing them to the ends of the tines.

The form of the invention illustrated in Fig. 3 consists of a pair of clamping discs 21 and 22 which are clamped together by means of a clamping bolt 23 which passes through the center of said discs. Tines 24, used in this form, consist of stiff round wire pieces bent back on themselves in nearly parallel relation to form pairs of tines 24. The pairs of tines 24 are held in position by clamping them between the discs 21 and 22. The tines are bent at right angles to the discs between the periphery of the discs and their ends. A handle 25 consists of a round metal bar which is bent back on itself to form a loop that is anchored around the bolt 23 as the handle is clamped between the discs.

The latter form of the invention is used similarly to the first form.

While specific forms of the improvement have been described and illustrated herein, it is desired to be understood that the same may be varied, within the scope of the appended claims, without departing from the spirit of the invention.

Having thus described the invention, what is claimed and desired secured by Letters Patent is:

1. A culinary utensil comprising: a plate member; a series of pairs of arms projecting radially outward from said plate member, said arms being bent at right angles to form pairs of tines; a handle; and means for detachably attaching said handle to said plate member.

2. A culinary utensil comprising: a plate member; a series of pairs of arms projecting radially outward from said plate member, said arms being bent at right angles to form pairs of tines; a handle; a pair of handle receiving sleeves formed on said plate member to receive furcations formed on one extremity of said handle.

3. A culinary utensil comprising: a plate member; a center depression indented in said plate member; a peripheral series of radial arms about said plate member, each of said arms being bent at right angles intermediate its length so that all of said arms will lie in a cylinder about the axis of said plate; and a handle member extending from said plate parallel to the plane thereof.

4. A culinary utensil comprising: a plate member; a center depression indented in said plate member; a peripheral series of radial arms about said plate member, each of said arms being bent at right angles intermediate its length so that all of said arms will lie in a cylinder about the axis of said plate; and a handle member extending from said plate parallel to the plane thereof, the extremities of said arms projecting from the concave face of said plate.

CHARLES A. LEWIS.